United States Patent [19]
Yogo

[11] Patent Number: 5,548,822
[45] Date of Patent: Aug. 20, 1996

[54] MOBILE STATION MONITORING SYSTEM

[75] Inventor: Hiroyuki Yogo, Aichi Pref., Japan

[73] Assignee: Aisin Seiki Kabushiki Kaisha, Kariya, Japan

[21] Appl. No.: 260,743

[22] Filed: Jun. 15, 1994

[30]      Foreign Application Priority Data

Jun. 15, 1993   [JP]   Japan ................................. 5-143950

[51] Int. Cl.$^6$ ........................... H04B 1/00; H04B 7/00
[52] U.S. Cl. ........................ 455/68; 455/54.1; 455/54.2
[58] Field of Search ................................ 455/34.1, 54.1, 455/54.2, 68; 340/988, 990, 991, 993, 995, 961, 994; 364/449, 460, 424.03; 342/457

[56]              References Cited

U.S. PATENT DOCUMENTS

| | | | |
|---|---|---|---|
| 3,568,161 | 3/1971 | Knickel | 340/990 |
| 3,789,198 | 1/1974 | Henson et al. | 340/990 |
| 4,914,733 | 4/1990 | Gralnick | 340/961 |
| 5,168,451 | 12/1992 | Bolger | 340/994 |
| 5,179,377 | 1/1993 | Hancock | 340/961 |
| 5,313,200 | 5/1994 | Sone | 340/990 |

*Primary Examiner*—Reinhard J. Eisenzopf
*Assistant Examiner*—Marsha D. Banks-Harold
*Attorney, Agent, or Firm*—Sughrue, Mion, Zinn, Macpeak & Seas

[57]                ABSTRACT

A mobile station monitoring system includes an order station, and a plurality of mobile stations each of which has a position detecting device for detecting its current position, a communicating device for transmitting information regarding its current position and operation condition and for receiving the current condition and operation condition of another mobile station, a memory device for storing the current position and operation condition of the another mobile station, and a displaying device for displaying the current position and operation condition of the another mobile station in such a manner that the current position and operation condition of the another mobile station is read from the memory device and imposed on a map corresponding to the vicinity of the current position of the another mobile station.

8 Claims, 3 Drawing Sheets

5,548,822

MOBILE STATION MONITORING SYSTEM

BACKGROUND OF THE INVENTION

1. Field of the Invention

The present invention relates to a mobile station monitoring system, and in particular to a mobile station monitoring system wherein the current position of each mobile station can be monitored by an order station and each mobile station can obtain information relating to other mobile stations directly.

2. Description of the Prior Art

In the pending U.S. patent application under the serial number of U.S. Pat. No. 5,355,511 a mobile station monitoring system is disclosed in which a plurality of taxies are under the control of an order station. In this system, the current position and operation condition of each of the taxies is set to be continually monitored by the order station, so that the order station can know how many empty taxies are in a specific area. Thus, a specific empty taxi can be informed of the number of empty taxies in the specific area from the order station and can make a decision, on the basis of the resultant number, whether it should cruise to another area of less empty taxies or not.

However, even though the number of empty taxies in the another area is less, the specific empty taxi can not know the distribution of other empty taxies in the another area, which may bring disadvantage for the specific empty taxi. In detail, if there is a railway station having a front exit side and a rear exit side in the another area, empty taxies are sometimes maldistributed at the front exit side of the railway station, and therefore no empty taxi may rest at the rear exit side of the railway station. In such a case, the specific empty taxi's cruising to the front exit side of the railway station is, as it were, vain effort.

SUMMARY OF THE INVENTION

It is, therefore, an object of the present invention to provide a mobile station monitoring system without the foregoing drawback.

It is another object of the present invention to provide a mobile station monitoring system in which a specific mobile station can know the distribution of other mobile stations.

In order to achieve these objects, a mobile station monitoring system is comprised of an order station, and a plurality of mobile stations each of which has a position detecting device for detecting its current position, a communicating device for transmitting information regarding its current position and operation condition and for receiving the current condition and operation condition of another mobile station, a memory device for storing the current position and operation condition of the another mobile station, and a displaying device for displaying the current position and operation condition of the another mobile station in such a manner that the current position and operation condition of the another mobile station is read from the memory device and imposed on a map corresponding to the vicinity of the current position of the another mobile station.

BRIEF DESCRIPTION OF THE DRAWINGS

Additional objects and advantages of the present invention will become more apparent from the following detailed description of preferred embodiments thereof when considered with reference to the attached drawings, in which.

DETAILED DESCRIPTION OF THE INVENTION

Figure 1:
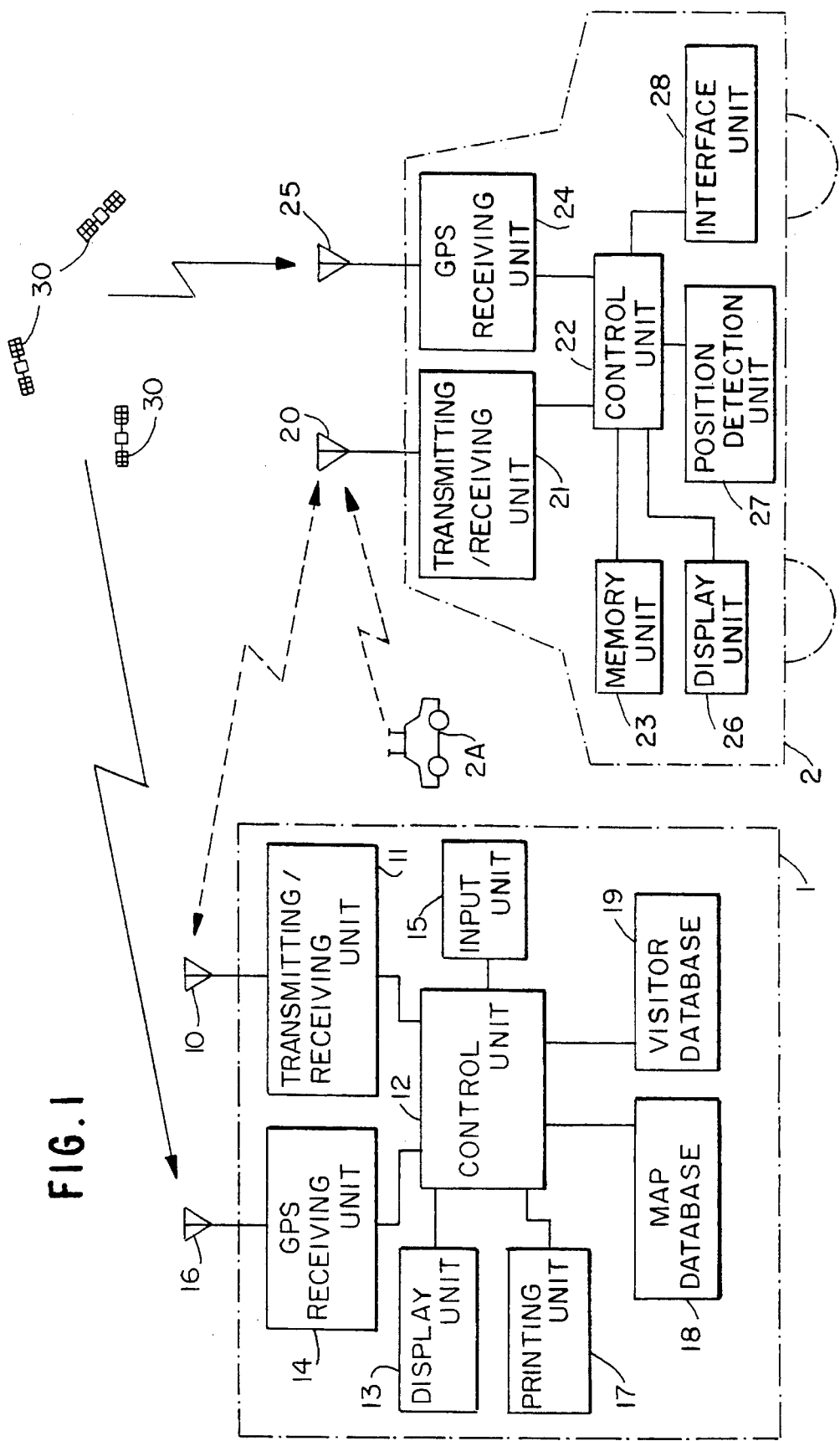
FIG. 1 is a block diagram showing a concept of a mobile station monitoring system in accordance with the present invention.

Referring first to FIG. 1, a mobile station monitoring system includes an order station 1, a first mobile station 2, and other mobile stations (one of them is refferred as a second mobile station 2A, and the remaining are not shown).

In the first mobile station 2, the current position of the first mobile station 2 is set to be detected by a position detection means 27. The resultant current position as well as the operation condition of the first mobile station 2 are transmitted from a transmitting/receiving unit 21 to the order station 1. The transmitting/receiving unit 21 also receives a reply request from the order station 1, and data regarding the current position and the operation condition of the second mobile station 2A which is in the neighbourhood of the first mobile station 2. The data regarding the current position and the operation condition of the second mobile station 2A is stored in a memory unit 23 together with a map data. The map data is read from the memory unit 23 and is displayed on a visual display unit 26 by a controller or a control unit 22. The controller 22 imposes the data regarding the current position and the operation condition of the second mobile station 2A on the resultant visual display unit 26.

The order station 1 has a transmitting/receiving unit or device 11 for transmitting (receiving) reply requesting data (transmitted data) from the order station 1 (each the mobile station 2) to each the mobile station 2 (the order station 1). The order station 1 is provided with a control unit 12 which controls the transmitting/receiving means 11 and other devices or units. The data from each the mobile station 2 are expected to be displayed on a display unit 13 which is in the form of a CRT or crystal liquid plate.

The transmitting/receiving unit or device 11 is one for business use or one to be used in MCA (Multi Channel Access) radio wave system. The transmitting/receiving unit 11 is connected to an antenna 10. The control unit 13 is equipped with an input unit 15 which is in the form of a key-board, a printing unit 17 which is in the form of one or more printers, a map database unit 18, and a customer or visitor database 19. In addition, the control unit 12 is equipped with a GPS receiving unit 14 with an antenna 16 in order to receive more precise position information of each the mobile station 2. Each the mobile station 2 has a transmitting/receiving unit 21 with an antenna 20 which is one for business use or one to be used in MCA (Multi Channel Access) radio wave system. The transmitting/receiving unit 21 is connected to the control unit 22. The control unit 22 is equipped with a GPS receiver 24 with an antenna 25, a position detection unit 27 which is expected to operate in conjunction with the GPS receiver 24, a memory unit 23, a display unit 26, and an interface unit 28 to which one or more optional electronic devices are connected, if necessary.

At the mobile station 2, normally, the GPS receiver 24 catches at its antenna 25 radio waves from three or more artificial satellites, and the resultant radio waves are fed via the control unit 22 to the position locating unit 27 in order that the current position of the mobile station 2 may be calculated. The data pertaining to the current position of the mobile station 2 includes its latitude and longitude. Such a method for obtaining the current position of the mobile station 2 may not be detailed due to the fact that it is well-known.

In order to obtain information relating to the current position of each the mobile station 2, reply requesting orders are issued thereto periodically. Whenever, in the mobile station 2, the transmitting/receiving unit 21 catches at its antenna 20, the controller 22 is fed with the resultant reply request order, the current position data obtained at the position locating unit 27 is expected to be transmitted, together with the operation information of the mobile station 2, to the order station 1 via the antenna 20. Moreover, the transmitting/receiving unit 21 is expected to catch both the current position data and the operation information of the another mobile station 2A which are being transmitted to the order station 1. Such both the current position data and the operation information of the another mobile station 2A are displayed, in an imposed manner, on the screen 26a of the display unit 26 on which map of a specific area is displayed. Thus, both the current position data and the operation information of the another mobile station 2A which is near the mobile station 2 can be fed directly to the mobile station 2. It is to be noted that only the latest current position data and the operation information of the another mobile station 2A can be stored in the memory unit 23 so as to be displayed on the screen 26a of the display unit 26 according to future demand.

Figure 2:
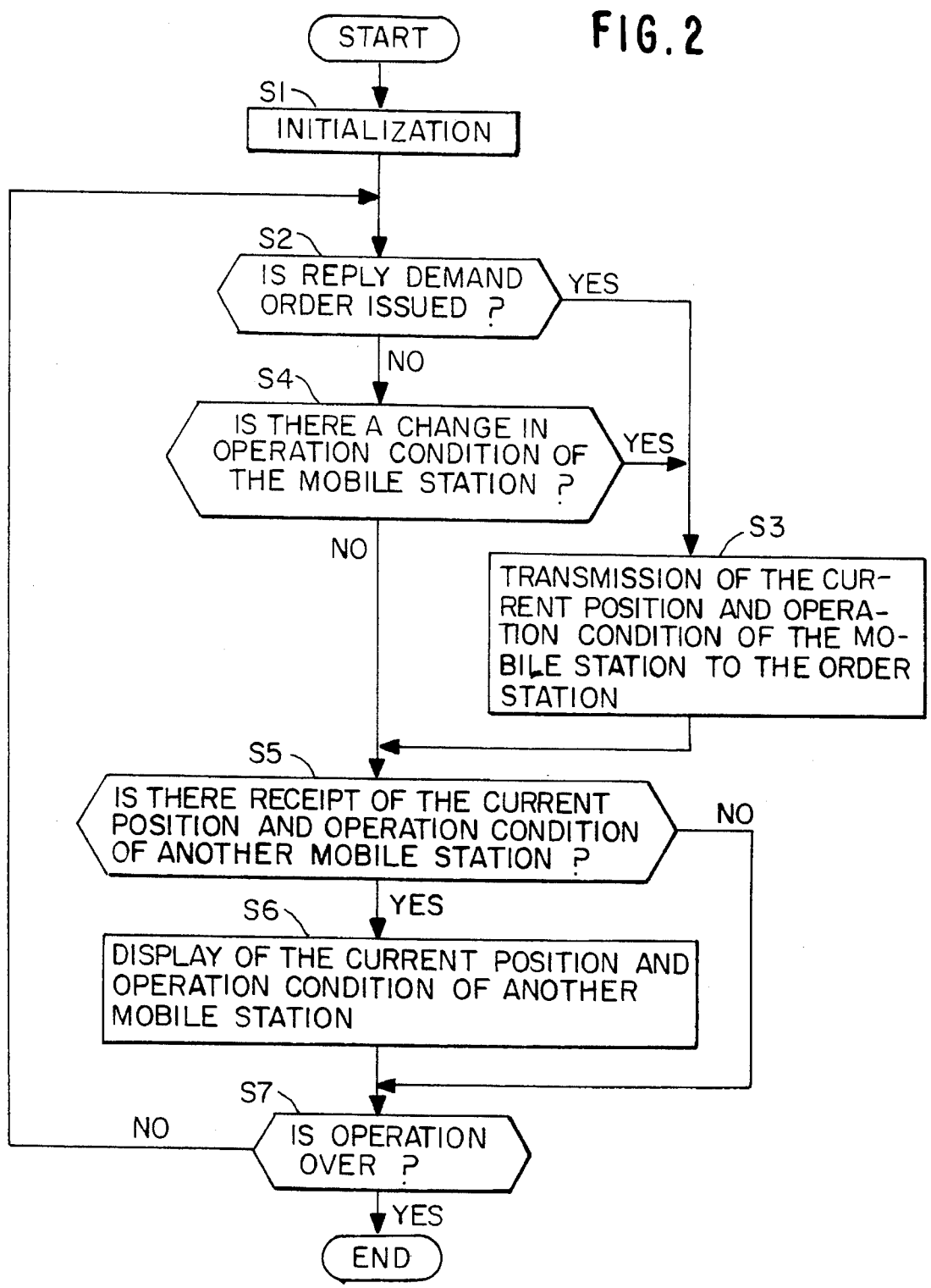
FIG. 2 is a flow-chart by which the mobile station monitoring system shown in FIG. 1 is controlled.

Next, with reference to the flow-chart illustrated in FIG. 2, the operating procedure of the controller 22 of the mobile station 2 will be explained.

First of all, at step S1, an initialization is made. When the control goes to step S2, it is checked whether the reply demand order is issued or not. If the result is positive, the control goes to step S3 in order to transmit the current position data and the operation information of the mobile station 2 are transmitted to the order station 1. On the other hand, if the result at step S2 is negative, step S4 is executed in order to check whether there is a change in the operation condition of the mobile station 2. If the mobile station 2 is a taxi, the operation condition change-occurs when the cruising taxi or resting taxi begins to carry one or more passengers for a fare or vise versa. Such changes are fed from a taximeter (not shown) or other unit connected to the interface unit 28. In case of the occurrence of the operation condition change, step S3 is executed and new current position data and the operation information of the mobile station 2 are fed to the order station 1. If the result at step S4 is negative, the control goes to step S5.

At step S5, it is checked whether the current position data and the operation information of the another mobile station 2A is received or not. If the results is positive, step S6 is executed and the current position and the operation information of the another mobile station 2A are imposed on the screen 26a of the display unit 26 on which the map is displayed on the basis of the map data base 18. It is to be noted that the current position of the another mobile station 2A is converted into a map coordinates before being imposed on the screen 26a of the display unit 26. When the execution of step S6 is completed or the result of step S5 is negative, step 7 is executed so as to check whether the operation is over or not. If the result is negative, the control goes to step S2 for further repetition execution of steps S2 to S7 inclusive. If the result at step 7 is positive, the control is terminated.

As previously mentioned, the mobile station 2 can recognize the reply of the another station 2A to the order station 1 and the content of the reply can be stored in the memory unit 23 and can be displayed on the screen 26a of the display unit 26. In other words, the current position data and the operation information of the another mobile station 2A is set to be displayed, at anytime or upon occasion, at the mobile station 2 as well as the order station 1.

Figure 3:
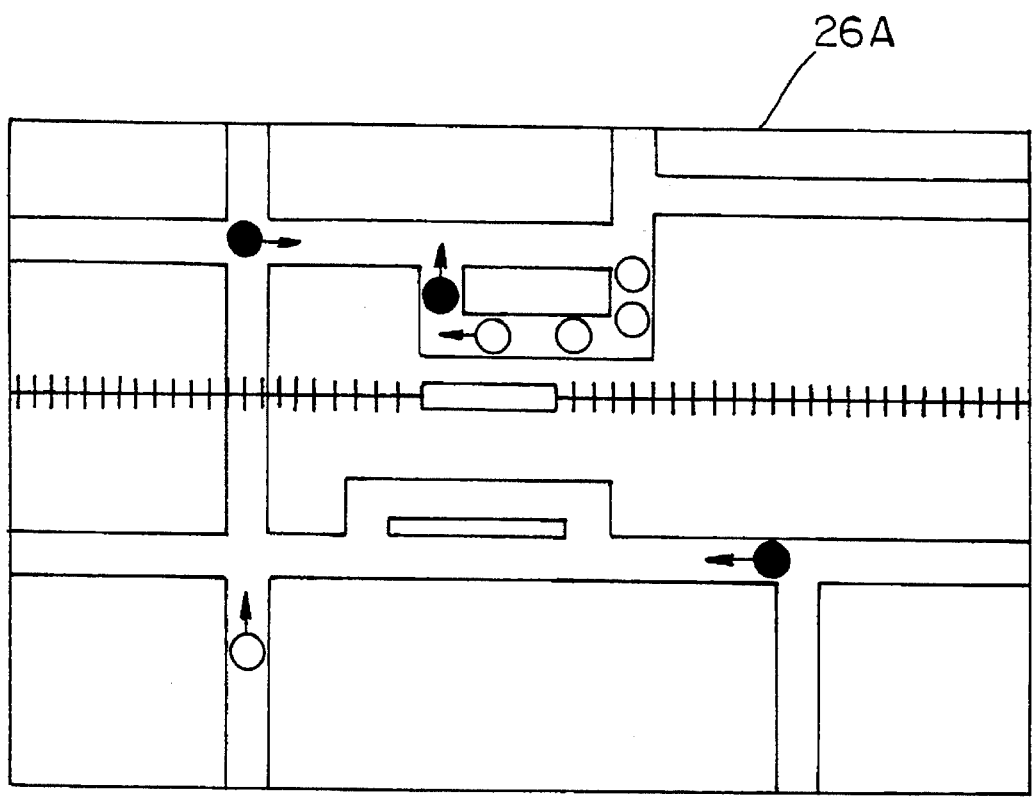
FIG. 3 is an example of an on-screen condition of a visual display.

With reference to FIG. 3, an example of such an interception is explained. A specific condition on the screen 26a of the display unit 26 in the mobile station 2 is illustrated in FIG. 3 wherein the symbol "○" denotes an empty taxi or a cruising taxi, the symbol "●" denotes a taxi carrying one or more passengers for a fare, and the symbol "→" denotes the moving direction of a taxi.

Watching the condition on the screen 26a of the display unit 26, a driver of the mobile station 2 can recognize, independent of the order from the order station 1, that the number of taxis at a front side of a railway station is larger than that at a rear side of the railway station, and makes a decision to move, his/her taxi to the rear side of the railway station. Instead of the vicinity of the railway station, another map including two big department stores can be displayed. Under such a screen, the driver can avoid his/her cruising toward one of the department stores around which other many taxis are cruising and makes his/her cruising toward the other of the department stores to the contrary. Thus, an effective taxi operation can be established.

It is to be noted that instead of the position detecting unit 27 as an independent unit its function can be built in the controller 22, the map to be displayed on the screen 26a can be transmitted from the order station 1 on occasion. The display unit 26 is desired to be of a multi-color one wherein the map and mobile stations are displayed in different colors for easy distinction therebetween.

The principles, preferred embodiments, and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A mobile station monitoring system comprising:
   an order station which is a fixed station having communicating means for periodically transmitting a reply demand to a plurality of mobile stations; and
   a plurality of mobile stations each of which has
      position detecting means for detecting its current position,
      communicating means for transmitting information regarding its current position and operation condition when the reply demand is received and for receiving the current condition and operation condition of other mobile stations,
      memory means for storing the current position and operation condition of other mobile stations, and
      displaying means for displaying the current position and operation condition of other mobile stations in such a manner that the current position and operation condition of other mobile stations are read from the memory means and imposed on a map corresponding to the vicinity of the current position of other mobile stations.

2. A mobile station monitoring system in accordance with claim 1, wherein the communicating means of the order station transmits the reply demand to a specified mobile station.

3. A mobile station monitoring system in accordance with claim 2, wherein the mobile station transmits information to the order station upon receiving the reply demand, wherein the communicating means of the mobile station receives information transmitted to the order station from another mobile station and wherein the communicating means of the order station receives information regarding the current positions and operation conditions of the mobile stations and wherein the order station further comprises:

memory means for storing current positions and operation conditions of the mobile stations and displaying means for displaying the current position and operation condition of the mobile stations in such a manner that the current position and operation condition of the mobile stations are read from the memory means and imposed on a map corresponding to the vicinity of the current position of the mobile stations.

4. A mobile station monitoring system in accordance with claim 3, wherein the mobile station is a taxi.

5. A mobile station monitoring system in accordance with claim 4, wherein the operation condition is either cruising or resting.

6. A mobile station monitoring system comprising:

an order station which is a fixed station having communicating means for receiving information regarding the current position and operation condition of a plurality of mobile stations, memory means for storing current positions and operation conditions of the mobile stations and displaying means for displaying the current position and operation condition of the mobile stations in such a manner that the current position and operation condition of the mobile stations are read from the memory means and imposed on a map corresponding to the vicinity of the current position of the mobile stations; and a plurality of mobile stations each of which has position detecting means for detecting its current position, communicating means for transmitting information regarding its current position and operation condition to the order station when an operation condition of the mobile station is changed and for receiving the current condition and operation condition of other mobile stations which is transmitted to the order station, memory means for storing the current position and operation condition of other mobile stations, and displaying means for displaying the current position and operation condition of other mobile stations in such a manner that the current position and operation condition of other mobile stations are read from the memory means and imposed on a map corresponding to the vicinity of the current position of other mobile stations.

7. A mobile station monitoring system in accordance with claim 6, wherein the mobile station is a taxi.

8. A mobile station monitoring system in accordance with claim 7, wherein the operation condition is either cruising or resting.

* * * * *